United States Patent
Sagl

[11] 3,790,808
[45] Feb. 5, 1974

[54] POWER TAKE-OFF SWITCH

[75] Inventor: Rudolph J. C. Sagl, Clarkson, Canada

[73] Assignee: B.E.L.-Tronics Limited, Mississauga, Ontario, Canada

[22] Filed: May 2, 1973

[21] Appl. No.: 356,509

[52] U.S. Cl. .............................. 307/10 R, 307/136
[51] Int. Cl. ............................................. H02g 3/00
[58] Field of Search 307/10 R, 10 BP, 136; 290/1 R; 180/53 D, 53 A

[56] References Cited
UNITED STATES PATENTS

| | | | |
|---|---|---|---|
| 3,681,611 | 8/1972 | Watson | 307/10 R |
| 3,676,694 | 7/1972 | Schneider | 307/10 R |
| 3,668,514 | 6/1972 | Peck | 307/10 R |
| 3,660,671 | 5/1972 | Peterson | 307/10 R |
| 3,655,991 | 4/1972 | Schneider | 307/10 R |
| 3,586,868 | 6/1971 | Martens et al. | 307/10 R |
| 3,497,709 | 2/1970 | Chilton | 307/10 R |
| 3,456,119 | 7/1969 | Schneider | 307/10 R X |

Primary Examiner—Robert K. Schaefer
Assistant Examiner—William J. Smith
Attorney, Agent, or Firm—Fetherstonhaugh & Co.

[57] ABSTRACT

A power take-off and switching device for use in a circuit of an internal combustion engine which includes a source of low voltage direct current, voltage regulator means, alternator means, and conductor means for connecting the source of low voltage current to the alternator by way of the voltage regulator in a conventional manner, said device comprising a normally closed first switch means in the power input circuit of an alternator, normally closed second switch means in the power output circuit of said alternator, power output receptacle means connected to the output of said alternator, supplementary conductor means for connecting said source of low voltage directly to the power input side of said alternator, normally open third switch means in said supplementary conductor means, actuator means for sequentially opening said first switch means to deactivate said alternator and thereafter opening said second switch means to disconnect the power output of the alternator from the low voltage source when the alternator is deactivated and thereafter closing said third switch means to supply low voltage power directly to said alternator such that when the alternator is driven a high voltage is supplied to said power output receptacle.

6 Claims, 5 Drawing Figures

PATENTED FEB 5 1974
3,790,808
SHEET 1 OF 2
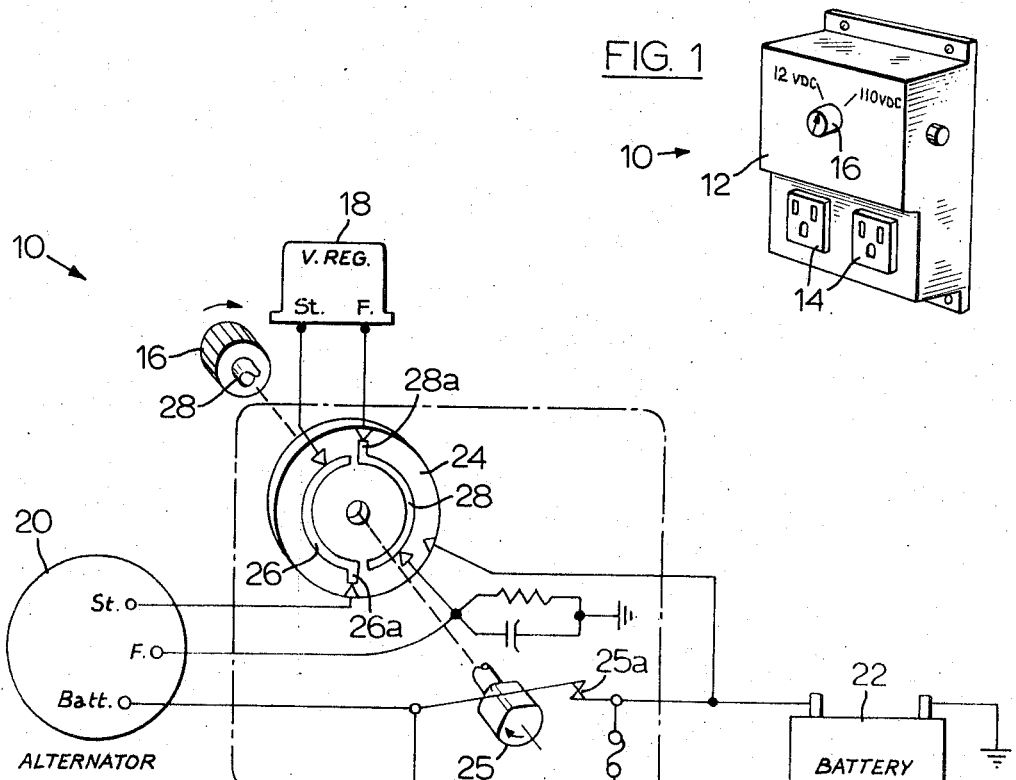
FIG. 1
FIG. 2
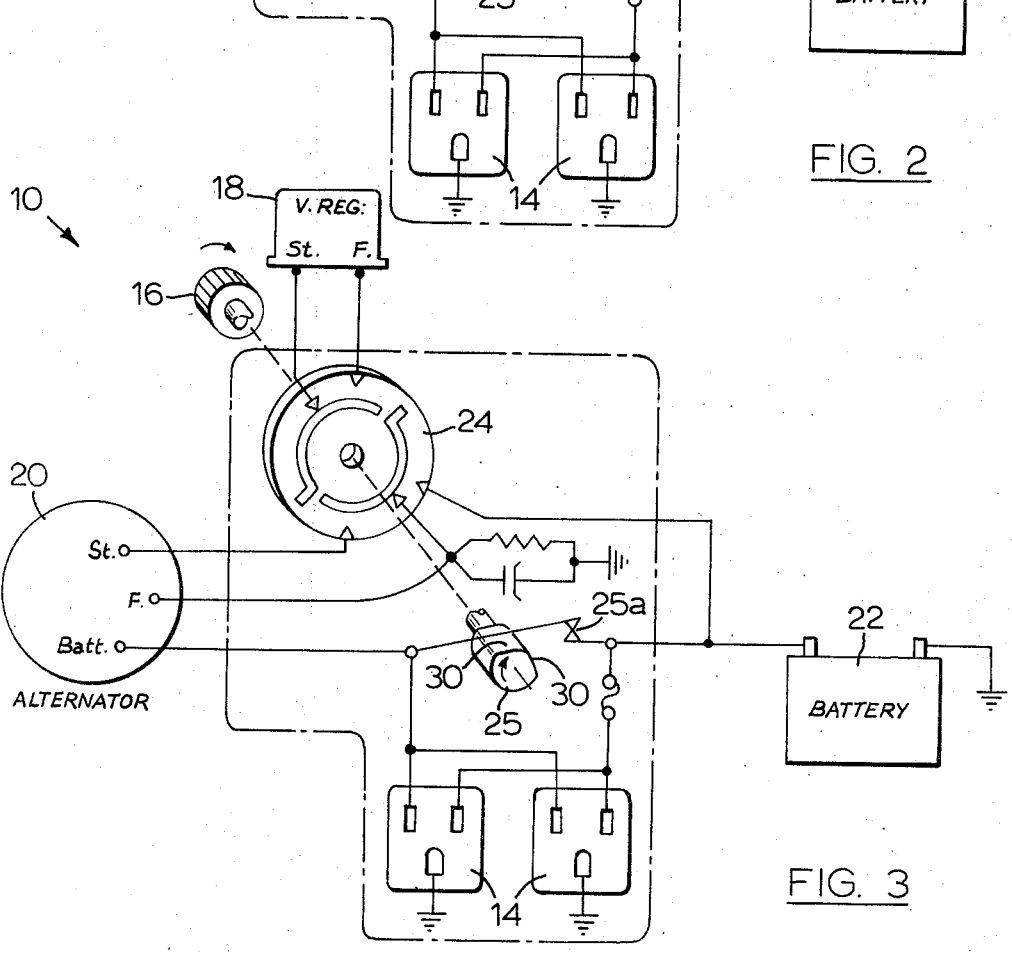
FIG. 3

POWER TAKE-OFF SWITCH

This invention relates to power take-off and switching devices. In particular, this invention relates to a power take-off device suitable for use in association with the alternator of an internal combustion engine or the like.

The engine of an automobile or the like has not previously been used to its fullest capacity as a source of power for power tools and the like in remote areas. Generally the practice has been to carry an independent generating device into the remote areas for use in driving tools and the like. With the wide use of alternators in the circuitry of the conventional automobile engine, a source of high voltage current is available. In the conventional circuitry of an internal combustion engine, the alternator and voltage regulator serve to provide a low voltage d.c. current which is not suitable for driving power tools and the like. Previous proposals for converting the circuitry to one which would provide 120 volt d.c. current has called for the introduction of a switch to the circuit such that in one switching operation the circuit is converted from a 12 volt system to a 120 volt system. These proposals have been quite unsatisfactory due to the fact that in switching considerable arcing occurs at the switch and consequently, the switch contacts burn up during the switching operation so that the device is a fire hazard when installed in an automobile and has a limited useful life.

One of the principal advantages derived from the use of an alternator in the power circuit of an internal combustion engine is the ability of the alternator to charge the battery when the engine is running at low idling speeds. If, however, the output of the alternator is used as a high voltage source by a simple interruption of the power circuit, the battery of the automobile will drain during the operation of the power tool. The draining of the battery may not be obvious to a user of a power tool because of the fact tht the engine of the automobile is running and, as a result, the operator finds that he is left with insufficient time to start the engine after using the power tool.

The present invention overcomes the difficulties of the prior art described above and provides a simple and inexpensive power take-off and switching device capable of operating without arcing at the switch contacts during changeover. The power take-off device of the present invention is also capable of providing for the charging of the battery during the use of the power tool when the alternator is driven by the engine.

According to an embodiment of the present invention, a power take-off and switching device comprises normally closed first switching means in the power input circuit of the alternator, normally closed second switch means in the power output circuit of the alternator, power output receptacle means connected to the output of the alternator, supplementary conductor means for connecting the source of low voltage directly to the power input side of the alternator, normally open third switch means in the supplementary conductor means and actuator means for sequentially opening the first switch means to deactivate the alternator and thereafter opening the second switch means to disconnect the power output of the alternator from the low voltage source when the alternator is deactivated and thereafter closing the third switch means to supply low voltage power (12v) directly to the field of the alternator such that when the alternator is driven, a high voltage is supplied to the power output receptacle.

The invention will be more clearly understood after reference to the following detailed specification read in conjunction with the drawings wherein FIG. 1 is a pictorial view of a power take-off and switching device according to an embodiment of the present invention;

FIG. 2 is a diagrammatic view of the circuit and switching device of the present invention with the switching device in the low voltage position;

FIG. 3 is a diagrammatic view similar to FIG. 2 showing the first step in the operation of the switching device to effect the changeover from the low voltage to high voltage condition;

Figure 4:
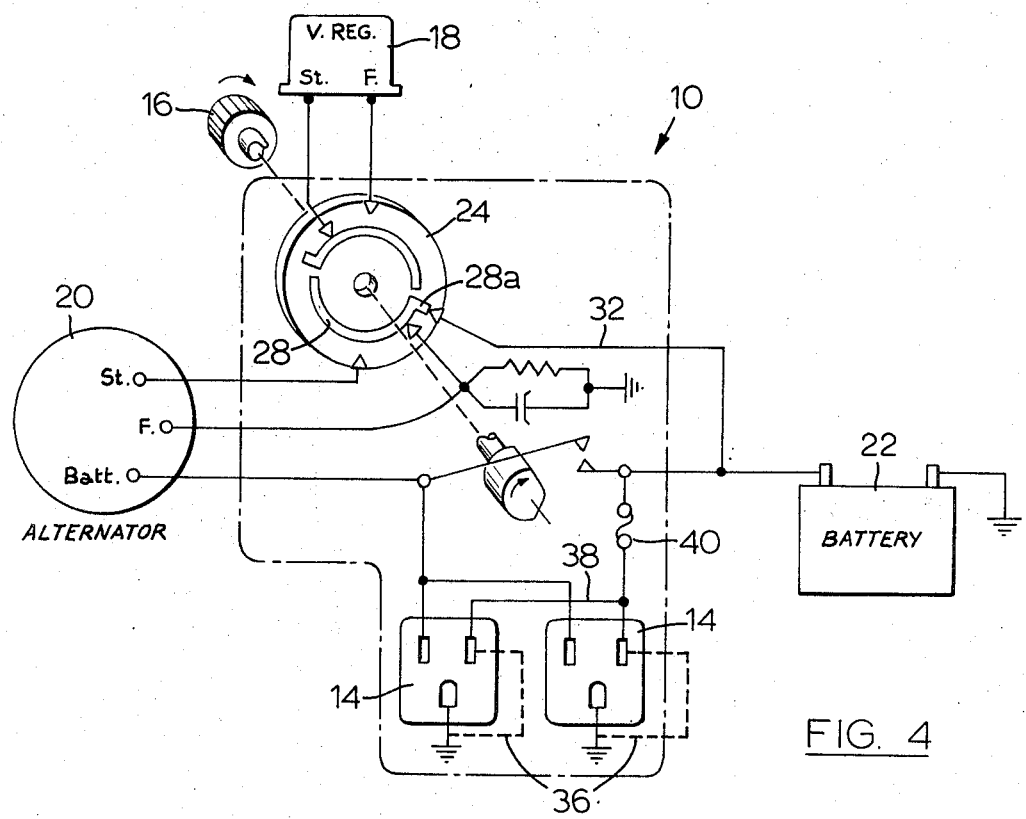
FIG. 4 is a view similar to FIG. 3 illustrating a further step in the changeover.

With reference to the drawings, the reference numeral 10 refers generally to a power take-off and switching device according to an embodiment of the present invention. The device 10 includes a housing 12, a pair of receptacles 14, and a switch control knob 16. The housing 12 has control markings to indicate the 12 volt and 110 volt positions and the control knob 16 has a narrow marking which is aligned with the markings of the housing to indicate which voltage is available at the power receptacle.

With reference to FIG. 2 of the drawings, the power take-off device 10 is shown in the circuit which includes voltage regulator 18, alternator 20 and battery 22. In the embodiment illustrated, two mechanical switching devices are illustrated, these including rotary disc 24 and rotary cam device 25. The rotary disc 24 and cam device 25 are mounted on a single shaft 28 at one end of which the control knob 16 is mounted. The rotary disc 24 has semi-circular slip ring contacts 26 and 28 with radial projections 26a and 28a.

In the 12 volt condition illustrated in FIG. 2 of the drawings, it will be seen that the power input circuit of the alternator is controlled by the voltage regulator such that the terminal of the alternator is connected to the stator of the voltage regulator by way of slip ring contacts 26a and 26 and the field terminal of the alternator is connected to the field terminal of the voltage regulator by way of slip ring contacts 28a and 28. In this condition, a 12 volt voltage is available at the receptacles 14 and power is supplied to the battery 22 from the battery terminal of the alternator by way of contacts 25a.

It will be apparent that if the contacts 25a were to be opened while the alternator remains active, considerable arcing would occur at the contacts. This is in fact what has happened in the devices which have previously been proposed. The present invention overcomes this difficulty by ensuring that the alternator is deactivated before the contacts 25a are opened.

With reference to FIG. 3 of the drawings, it will be seen that by rotating, the alternator 20 is deactivated while the contacts 25a remain in contact. The alternator 20 is deactivated by disconnecting the field of the voltage regulator from the field of the alternator and the stator of the voltage regulator from the stator of the alternator. It will be noted that the cam block 25 is provided with faces 30 which are sufficiently close to the axis of rotation to permit the cam block 25 to rotate without opening the contacts 25a.

Figure 5:
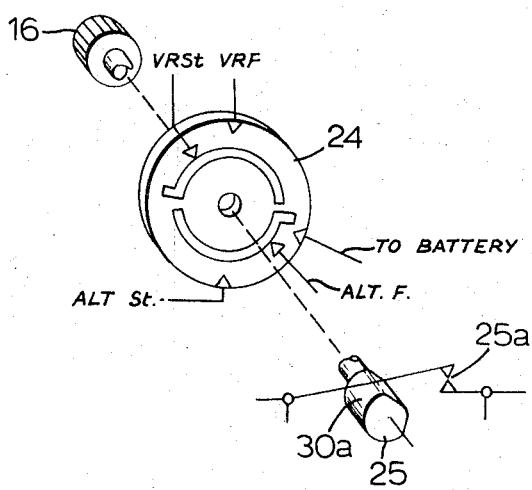
FIG. 5 is a diagrammatic view again illustrating a step in the switchover.

The next stage in the operation of the switching device is illustrated in FIG. 5 of the drawings wherein it will be seen that the contacts 25a are opened by the cam surface 30a of the cam device 25. It will be noted that in this interim position all of the switches are open so that no power is flowing through the circuit.

Further rotation of the switching device to the position shown in FIG. 4 of the drawings causes the supplementary conductor 32 to be placed in contact with the extension 28a of the slip ring contact 28 which is in turn connected to the field of the alternator. When the alternator is driven undr these conditions, a 110 voltage d.c. output is available at the receptacles 14. under From the foregoing it will be apparent that during the transfer from the 12 volt to the 110 volt condition, the alternator is deactivated before the power output circuit is interrupted so that no arcing occurs at the contacts of the output switches.

In the conventional receptacle for use in a direct current application, one of the contacts of the receptacle is usually grounded as shown in broken lines at 36 in the bottom view of the receptacles illustrated in FIG. 4. If this condition was allowed to exist in the present power switching device, the effect would be that when the power tool is in use the battery would continuously drain by reason of the fact that it is providing power to the field of the alternator. It has been found that the drain on the battery can be eliminated by connecting the normally grounded terminal of the receptacle to the battery by means of conductors 38 and by providing a 10 to 15 amp. fuse 40 in the line which is connected to the battery. It has been found that the internal resistance of appliances such as power drills, saws, heaters and the like acts as a load so that during operation of the 110 volt circuit, the battery will not be run down.

From the foregoing, it will be apparent that the present invention provides a simple and inexpensive power take-off and switching device which is capable of switching to and from a 12 volt and 110 volt condition without causing any arcing at the contacts of the power switches even under full load conditions and high R.P.M. It will also be apparent that the present invention provides a circuit wherein the battery will not be run down when the receptacles are in use in the operation of a power tool or the like.

The embodiments of the invention in which an exclusive property or privilege is claimed are defined as follows:

1. A power take-off and switching device for use in a circuit of an internal combustion engine which includes a source of low voltage direct current, voltage regulator means, alternator means, and conductor means for connecting the source of low voltage current to the alternator by way of the voltage regulator in a conventional manner, said device comprising
    a. normally closed first switch means in the power input circuit of an alternator,
    b. normally closed second switch means in the power output circuit of said alternator,
    c. power output receptacle means connected to the output of said alternator,
    d. supplementary conductor means for connecting said source of low voltage directly to the power input side of said alternator,
    e. normally open third switch means in said supplementary conductor means,
    f. actuator means for sequentially opening said first switch means to deactivate said alternator and thereafter opening said second switch means to disconnect the power output of the alternator from the low voltage source when the alternator is deactivated and thereafter closing said third switch means to supply low voltage power directly to said alternator such that when the alternator is driven a high voltage is supplied to said power output receptacle.

2. A device as claimed in claim 1 wherein said power output receptacle is connected in parallel with said second switch means such that when the receptacle is connected to the internal resistance of an appliance, the source of low voltage direct current is recharged.

3. A device as claimed in claim 1 including a second power output receptacle connected in parallel with said first mentioned receptacle.

4. A device as claimed in claim 1 wherein said first, second and third switch means and said actuator means are incorporated in a single rotary switch whereby the sequential operation of the switching means is controlled by rotation of the rotor of the switch.

5. A power output device for use in an electrical circuit of an internal combustion engine which includes a source of low voltage direct current, voltage regulator means, alternator means and conductor means for connecting the source of low voltage current to the alternator by way of the voltage regulator, said device including,
    a. unitary rotary switching device having normally closed first switch contact means connectible in the power input circuit of the alternator,
    b. normally closed second switch contact means connectible in the power output circuit of the alternator,
    c. normally open third switch contact means,
    d. conductor means for connecting said third switch contact means to said source of low voltage direct current and said power input side of the alternator,
    e. unitary actuator means for sequentially opening said first contact means and thereafter opening said second switch contact means while said first switch contact means remains open and thereafter closing said third switch contact means while said first and second switch contact means remain open.

6. A power take-off device as claimed in claim 5 having power output receptacle means, one terminal of which is connected to the battery power output terminal of the alternator and the other terminal of which is connected to the battery terminal, said power output receptacle means being connected in parallel with said second switch means such that when said second switch means is closed, a 12-volt output is available at said receptacle and when said second switch means is open, a 110-volt output is available at said power output receptacle.

* * * * *

UNITED STATES PATENT OFFICE
CERTIFICATE OF CORRECTION

Patent No. 3,790,808  Dated February 5, 1974

Inventor(s) Rudolph J. C. Sagl

It is certified that error appears in the above-identified patent and that said Letters Patent are hereby corrected as shown below:

On the cover sheet insert:

-- [30] Foreign Application Priority Data

Canada          153625         October 11, 1972 --.

Signed and sealed this 29th day of October 1974.

(SEAL)
Attest:

McCOY M. GIBSON JR.  C. MARSHALL DANN
Attesting Officer  Commissioner of Patents